United States Patent
Ritchie et al.

(10) Patent No.: US 8,820,489 B2
(45) Date of Patent: Sep. 2, 2014

(54) ELECTRIC MOTOR WITH STATIC BRAKE

(75) Inventors: Adam Ritchie, Rochester Hills, MI (US); Mark C. Smith, Troy, MI (US); Lon Cooper, Royal Oak, MI (US)

(73) Assignee: Arvinmeritor Technology, LLC, Troy, MI (US)

( * ) Notice: Subject to any disclaimer, the term of this patent is extended or adjusted under 35 U.S.C. 154(b) by 2190 days.

(21) Appl. No.: 11/714,936

(22) Filed: Mar. 7, 2007

(65) Prior Publication Data

US 2008/0217119 A1  Sep. 11, 2008

(51) Int. Cl.
| | | |
|---|---|---|
| *B60L 7/00* | (2006.01) | |
| *F16D 65/18* | (2006.01) | |
| *H02K 7/102* | (2006.01) | |
| *F16D 121/12* | (2012.01) | |

(52) U.S. Cl.
CPC ............ *H02K 7/102* (2013.01); *F16D 2121/12* (2013.01); *F16D 65/186* (2013.01)
USPC .......................................... 188/161; 188/170

(58) Field of Classification Search
CPC ........................ F16D 2121/12; F16D 2121/02
USPC .............. 188/170, 161, 41.2, 41.4; 180/65.1, 180/65.51; 192/18 A, 84.95, 85.33, 85.37, 192/85.53, 90; 418/61.3; 310/76, 77, 92, 93
See application file for complete search history.

(56) References Cited

U.S. PATENT DOCUMENTS

| | | | | |
|---|---|---|---|---|
| 2,726,726 A | * | 12/1955 | Le Tourneau ............... | 180/65.51 |
| 3,500,970 A | * | 3/1970 | Schilling ........................ | 188/170 |
| 3,688,878 A | * | 9/1972 | Barmasse ...................... | 188/170 |
| 3,863,038 A | * | 1/1975 | Kreitner et al. ............... | 188/170 |
| 3,892,300 A | * | 7/1975 | Hapeman et al. ........... | 180/65.51 |
| 3,893,556 A | * | 7/1975 | Lech et al. .................. | 192/85.33 |
| 3,967,706 A | * | 7/1976 | King .............................. | 188/170 |
| 4,078,637 A | * | 3/1978 | Hanks ........................... | 188/170 |
| 4,128,145 A | * | 12/1978 | Euler ............................ | 188/71.2 |
| 4,129,204 A | * | 12/1978 | Hedgcock ................... | 192/89.22 |
| 4,279,330 A | * | 7/1981 | Pottorff et al. ............... | 188/71.7 |
| 4,330,045 A | * | 5/1982 | Myers ......................... | 180/65.51 |
| 4,574,924 A | * | 3/1986 | Gottling ........................ | 188/187 |
| 4,604,915 A | * | 8/1986 | Soffge et al. .................. | 475/337 |
| 4,645,039 A | | 2/1987 | Lewis et al. | |
| 4,684,838 A | * | 8/1987 | Casanova ........................ | 310/93 |

(Continued)

FOREIGN PATENT DOCUMENTS

| | | |
|---|---|---|
| DE | 10331186 | 1/2005 |
| WO | 2007022865 | 3/2007 |

OTHER PUBLICATIONS

Extended European Search Report dated Mar. 5, 2009.

*Primary Examiner* — Robert A Siconolfi
*Assistant Examiner* — Mahbubur Rashid
(74) *Attorney, Agent, or Firm* — Brooks Kushman P.C.

(57) ABSTRACT

An electric motor for driving a vehicle wheel includes a parking brake that is selectively applied to provide a park brake condition. The parking brake is a clutch style brake and includes a sliding brake disk that is mounted for rotation with a motor shaft. A brake piston is used to move the sliding brake disk into engagement with a motor housing to achieve a park applied position. The parking brake is held in a release position by a hydraulic system that exerts a fluid pressure force against the brake piston. A resilient mechanism cooperates with the brake piston to apply the parking brake once the fluid pressure force is diminished.

33 Claims, 3 Drawing Sheets

(56) References Cited

U.S. PATENT DOCUMENTS

| | | | | |
|---|---|---|---|---|
| 4,696,378 A | * | 9/1987 | Brooks | 188/170 |
| 5,666,012 A | * | 9/1997 | Gongwer | 310/87 |
| 5,878,830 A | | 3/1999 | Ruppert et al. | |
| 5,924,504 A | | 7/1999 | Ruppert et al. | |
| 6,100,609 A | * | 8/2000 | Weber | 310/12.32 |
| 6,276,474 B1 | | 8/2001 | Ruppert et al. | |
| 6,405,837 B1 | * | 6/2002 | Muramoto | 188/72.5 |
| 7,100,722 B2 | * | 9/2006 | Bowen | 180/65.51 |

* cited by examiner

ELECTRIC MOTOR WITH STATIC BRAKE

TECHNICAL FIELD

The subject invention relates to a static brake that is incorporated into an electric motor for driving a vehicle wheel.

BACKGROUND OF THE INVENTION

Electric motors are often used to drive a wheel as opposed to using a traditional combustion engine powertrain. Electric motors can also be used as part of a hybrid configuration to provide supplemental driving power to the vehicle wheel. The use of electric motors offers improved fuel economy as a primary advantage.

One difficulty presented by the addition of an electric motor to a wheel drive unit is the incorporation of a static or parking brake feature. In current motor configurations it is difficult to package an effective parking brake mechanism within the limited available space.

Thus, there is a need for an electric motor and parking brake combination that can be effectively and efficiently packaged within available space at a wheel.

SUMMARY OF THE INVENTION

An electric motor for driving a vehicle wheel includes a parking brake that is selectively movable between a release position and an applied position. The electric motor includes a motor housing and a motor shaft that is rotatable about a motor axis relative to the motor housing. A parking brake disk is mounted for rotation with the motor shaft and is slidable along the motor shaft relative to the motor housing. At least one brake piston is held against rotation about the motor axis and is slidable along the motor axis to move the parking brake into engagement with the motor housing to achieve the applied position.

In one example, the parking brake is held in the release position by a fluid pressure system that exerts a fluid pressure force against the brake piston. This releases the parking brake disk from engagement with the motor housing. In response to a parking brake request, the fluid pressure force is discharged and a resilient mechanism applies a force against the brake piston to move the brake piston into engagement with the parking brake disk. This in turn forces the parking brake disk to slide into engagement with the motor housing to achieve the applied position.

In one example, a single brake piston is used to apply the parking brake. The single brake piston includes a disc shaped body with plurality of pockets for receiving spring elements. In another example, a plurality of brake pistons is used to apply the parking brake. Each brake piston is slidably supported within a brake housing that is mounted to the motor housing. Each brake piston includes a recess that receives a spring element.

The parking brake disk and the brake piston cooperate to provide a compact and efficient parking brake for a vehicle wheel that is easily packaged within existing space limits.

These and other features of the present invention can be best understood from the following specification and drawings, the following of which is a brief description.

DETAILED DESCRIPTION OF THE PREFERRED EMBODIMENT

Figure 1:
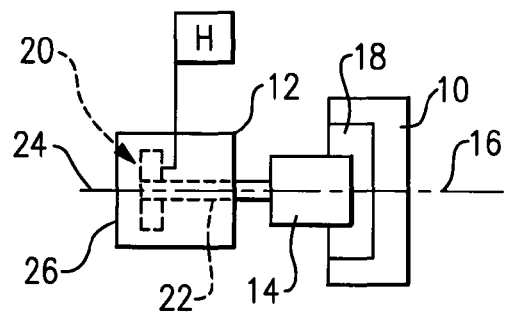
FIG. 1 is a schematic representation of a vehicle wheel assembly driven by an electric motor incorporating the subject invention.

A vehicle wheel 10 is driven by an electric motor 12 as shown in FIG. 1. The electric motor 12 can be used to provide the sole driving input to the vehicle wheel 10 or can be used in a hybrid configuration to provide supplemental driving input to the vehicle wheel 10 as needed. In the example shown, the electric motor 12 drives a gear reduction 14, which in turn is coupled to drive the vehicle wheel 10; however, a gear reduction may not be required depending upon the vehicle application.

The vehicle wheel 10 rotates about a wheel axis 16 and includes a wheel brake 18 that applies a brake force to the wheel in response to operational braking requests that occur during vehicle operation. The wheel brake 18 can be any type of brake including a drum brake or disk brake, for example, and can be mechanically and/or electrically applied.

A static or parking brake 20 is associated with the electric motor 12 to provide a park brake feature at the vehicle wheel 10 that is independent of the wheel brake 18. The electric motor 12 includes a motor shaft 22 that rotates about a motor axis 24 relative to a motor housing 26. In the example shown, the motor axis 24 is coaxial with the wheel axis 16 to provide the benefit of a compact, in-line configuration; however, the motor axis 24 could also be arranged in other configurations relative to the wheel axis 16.

The parking brake 20 is a clutch style brake and is supported on the motor shaft 22. The parking brake 20 is independent of the wheel brake 18 and is movable between a release position and an applied position. In the release position, the vehicle wheel 10 is free to rotate and can be braked as needed by the wheel brake 18. In the applied position the parking brake 20 exerts a parking brake force to hold the vehicle wheel 10 against rotation when an associated vehicle is parked. During normal vehicle operation, a vehicle fluid pressure system, such as a hydraulic system H for example, holds the parking brake 20 in the release position. In response to a parking brake request, fluid pressure exerted against the parking brake 20 is discharged and the parking brake 20 can then be moved into an applied position. This will be discussed in greater detail below.

Figure 3:
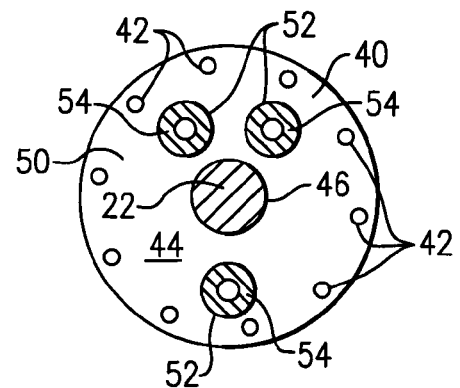
FIG. 3 is an end view of the example shown in FIG. 2.
Figure 2:
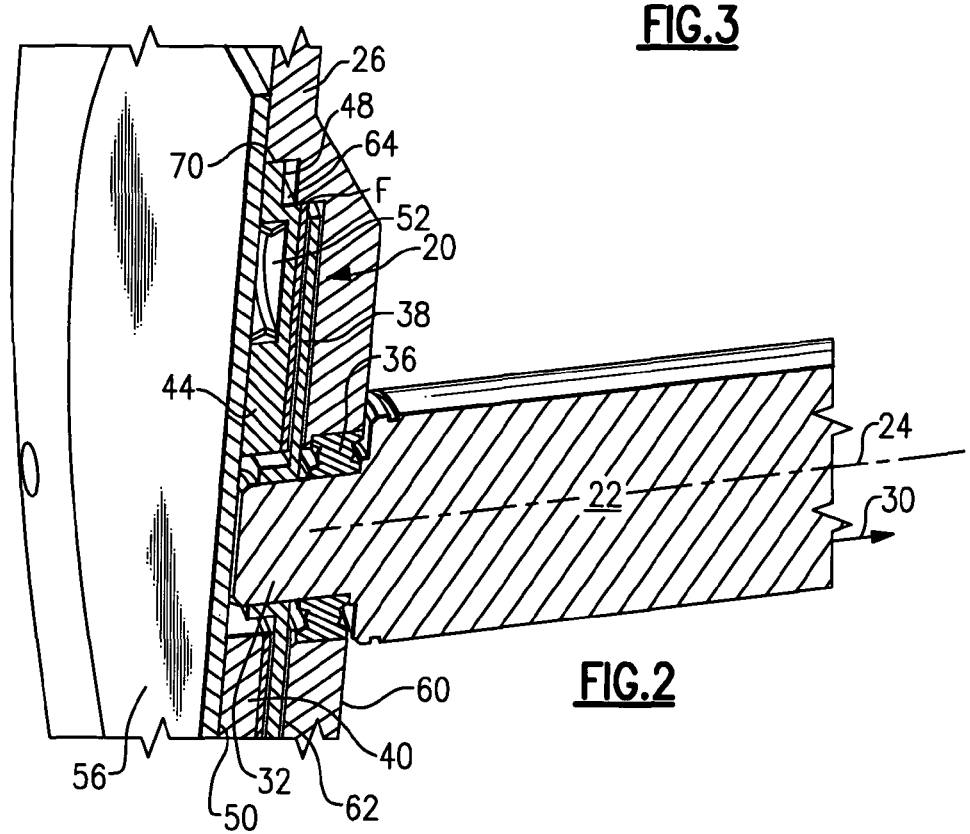
FIG. 2 is a partial cross-sectional view of one example of a parking brake and electric motor configuration.

One example parking brake configuration is shown in FIGS. 2-3. In this configuration, the motor shaft 22 includes an outboard end 30 that extends in an outboard direction toward the vehicle wheel 10 and an inboard end 32 that extends in an inward direction toward a vehicle center. The motor shaft 22 is supported on a bearing 36 for rotation about the motor axis 24 relative to the motor housing 26. The outboard end 30 of the motor shaft 22 extends outboard of the motor housing 26.

The parking brake 20 includes a parking brake disk 38 that is coupled for rotation with the motor shaft 22 about the motor axis 24. The parking brake disk 38 is also mounted to be axially movable relative to the motor shaft 22 in a direction along the motor axis 24. In the example shown, a spline connection interface is used to secure the parking brake disk 38 to the motor shaft 22, however, other types of connections could also be used.

A brake piston 40 cooperates with the parking brake disk 38 to move the parking brake disk 38 between the release position and an applied condition. In the release position, the parking brake disk 38 is free to rotate with motor shaft 22 during normal, non-wheel braking, vehicle operation. In the applied position, the parking brake disk 38 is slid into engagement with the motor housing 26 to achieve an applied park brake condition. A friction pad or layer of friction material F is applied to an engagement surface of one or more of the brake piston 40, parking brake disc 38, and motor housing 26 to facilitate generation of a park brake force. In the example shown in FIG. 2, the friction material F is located on an outboard surface of the brake piston 40.

The brake piston 40 is supported by the motor housing 26, which is a non-rotating component mounted to a vehicle chassis, frame, or other non-rotating vehicle structure (not shown). The brake piston 40 is mounted such that the brake piston 40 cannot rotate relative to the motor housing 26, but can slide relative to the motor housing 26 along the motor axis 24. In the example shown, sliding pins 42 (FIG. 3) are used to couple the brake piston 40 to the motor housing 26.

In this example, the brake piston 40 comprises a single piston having a disc-shaped body 44 (FIG. 3) with a center opening 46 that is coupled to the motor shaft 22 as described above. The disc-shaped body 44 has a first surface 48 (FIG. 2) that faces the parking brake disc 38 and a second surface 50 that faces opposite the first surface 48. A plurality of pockets 52 (only one is shown in FIG. 2) is formed within the disc-shaped body 44, which are open to the second surface 50. Each pocket 52 receives a resilient spring assembly 54 (FIG. 3), such as a coil spring, stack of spring members, etc. In the example shown, three pockets 52 and spring assemblies 54 (FIG. 3) are utilized, however, fewer or additional pockets 52 and spring assemblies 54 could be used as needed.

The spring assemblies 54 react between the second surface 50 of the brake piston 40 and an end cap 56. The end cap 56 is fixed to the motor housing 26 to enclose the brake piston 40 and parking brake disk 38 within a housing recess 70 formed between the end cap 56 and motor housing 26.

The motor housing 26 includes an internal surface 60 that faces an interior cavity of the electric motor 12 that houses the rotor and stator (not shown) and an external surface 62 that faces opposite of the internal surface 60. A fluid cavity 64 is formed between the external surface 62 of the motor housing 26 and the first surface 48 of the brake piston 40. This fluid cavity 64 receives fluid to generate a fluid pressure force that holds the brake piston 40 in a release position such that the parking brake disc 38 can rotate with the motor shaft 22. In the example shown, the fluid cavity 64 receives hydraulic fluid from the hydraulic vehicle system H (FIG. 1).

In response to a parking brake request, the fluid pressure exerted on the brake piston 40 is evacuated or discharged such that resilient forces stored within the spring assemblies 54 are sufficient to push the brake piston 40 against the parking brake disk 38 once the fluid pressure falls below a predetermined level. This force causes the parking brake disc 38 to slide into direct engagement with the external surface 62 of the motor housing 26 to apply the parking brake 20. Any type of fluid connections and controls could be utilized to control fluid flow between the fluid pressure system and fluid cavity 64.

In the example shown in FIGS. 2-3, the parking brake disk 38 is immediately adjacent to the external surface 62 of the motor housing 26. The parking brake disk 38 is positioned just outside of the motor housing 26 in the housing recess 70, with the brake piston 40 being immediately next to the parking brake disk 38. The end cap 56 is next to the brake piston 40 and is directly attached to the motor housing 26 such that the brake piston 40 and parking brake disk 38 are sandwiched directly between the motor housing 26 and the end cap 56. This provides a very compact parking brake configuration for applying a park brake force at the wheel for an electrically driven wheel application.

Figure 4:
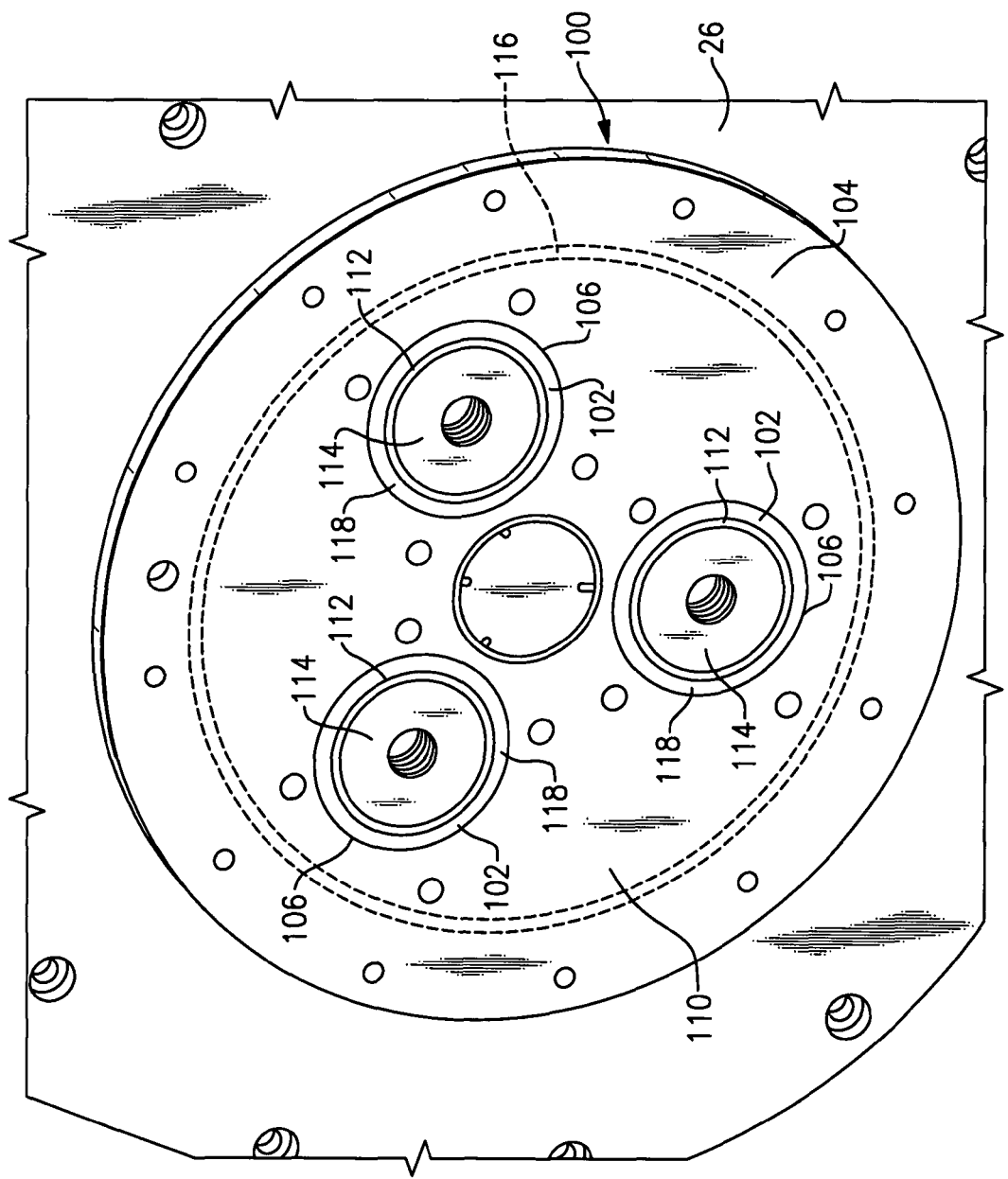
FIG. 4 is an end view of another example of a parking brake and electric motor configuration.
Figure 5:
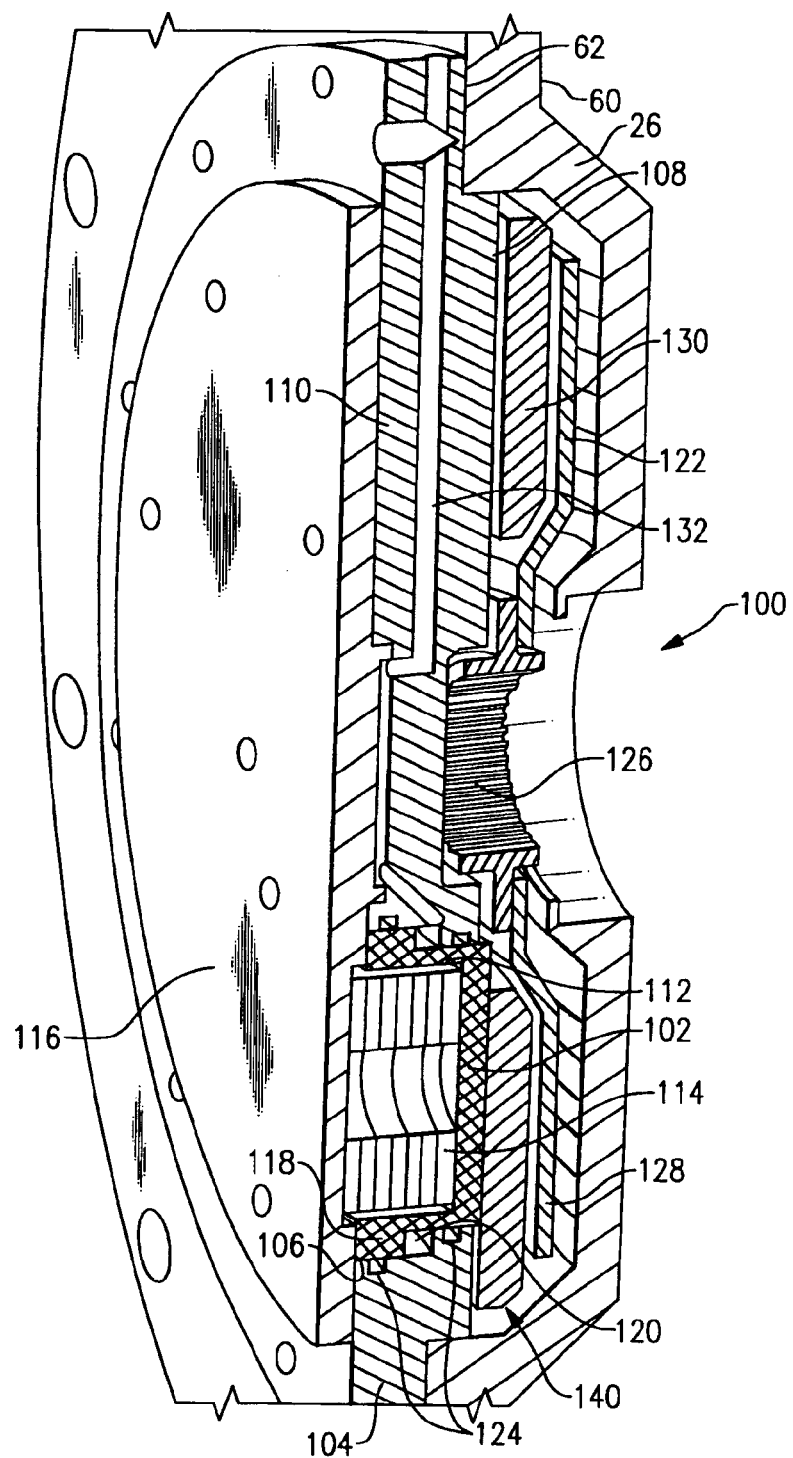
FIG. 5 is a cross-sectional view of the example of FIG. 4.

Another parking brake configuration is shown in FIGS. 4 and 5. This example shows a parking brake 100 that is similar to that of FIGS. 2-3 but instead of a single piston, a plurality of pistons 102 are utilized to apply the parking brake 100. Three pistons 102 are shown in this configuration, however, it should be understood that the number of pistons could vary depending upon application requirements. The pistons 102 are slidably supported within a brake housing 104 that is attached to the motor housing 26.

The brake housing 104 includes openings 106 for each piston 102 that extends from an outboard face 108 (FIG. 5) to an inboard face 110. Each piston 102 includes a recess 112 that receives a spring assembly 114 similar to that described above. Once the spring assemblies 114 are installed, the recesses 112 are closed off by an end cap 116 (FIG. 5) that is fixed to the brake housing 104.

Each piston 102 also includes an increased diameter flange portion 118 that is circumferentially formed about the piston 102. When installed within the brake housing 104, a fluid cavity 120 (FIG. 5) is formed around each piston 102 between the increased diameter flange portion 118 and the brake housing 104. This fluid cavity 120 receives fluid to generate a fluid pressure force that holds the brake pistons 102 in the release position such that a parking brake disc 122 can rotate with the motor shaft 22. In the example shown, the fluid cavity 120 receives hydraulic fluid from the hydraulic vehicle system H (FIG. 1). Seals 124 are mounted within the brake housing 104 around each brake piston 102 to seal the fluid cavity 120. Porting 132 is provided within the brake housing 104 such that fluid can be conducted to the fluid cavities 120 for each of the brake pistons 102.

The parking brake disk 122 is secured to the motor shaft 22 with a spline attachment similar to that described above with regard to FIG. 2. In the example shown in FIG. 5, parking brake disk 122 is a two-piece component including a spline collar 126 and a disk plate 128 fixed to a flange of the spline collar 126, however, a single piece parking brake disk, such as that of FIG. 1, could also be used in this configuration. Similarly, the parking brake disk 122 of FIG. 5 could be used in the configuration of FIG. 2.

A brake actuating ring 130 is positioned axially between the brake housing 104 and the parking brake disk 122. The brake pistons 102 engage a surface of the brake actuating ring 130 to move the parking brake disk 122 to apply the parking brake 100.

As discussed above, fluid pressure forces are exerted against the brake pistons 102 to hold the parking brake 100 in a release position. In response to a parking brake request, the fluid pressure exerted on the brake pistons 102 is evacuated or discharged such that resilient forces stored within the spring assemblies 114 are sufficient to push the brake pistons 102 against the brake actuating ring 130 once the fluid pressure falls below a predetermined level. This resilient force causes the brake actuating ring 130 to contact the parking brake disc 122, which slides into direct engagement with the external surface 62 of the motor housing 26 to apply the parking brake 100.

In the example shown in FIGS. 4-5, the parking brake disk 122 is immediately adjacent to the external surface 62 of the motor housing 26. The parking brake disk 122 is positioned just outside of the motor housing 26 in a housing recess 140, with the brake actuating ring 130 being immediately next to the parking brake disk 122. The brake housing 104 and brake pistons 102 are adjacent to the brake actuating ring 130, and the end cap 116 is adjacent to the brake housing 104 to close off the housing recess 140. The end cap 116 is directly attached to the brake housing 104, and the brake housing 104 is directly attached to the motor housing 26 such that the brake pistons 102 and parking brake disk 122 are enclosed within the housing recess 140 that is formed between the motor housing 26 and the end cap 116. This provides a very compact parking brake configuration for applying a park brake force at the wheel for an electrically driven wheel application.

The configuration of FIGS. 4-5 provides an additional advantage of more evenly distributing brake forces against the parking brake disk 122 and motor housing 26. The configuration of FIGS. 2-3, which utilizes a single brake piston, may have a tendency to tilt or bind as the spring assemblies apply force to move the parking brake to the applied position. Using multiple, separate pistons prevents any tilting from occurring.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel drive comprising:
an electric motor having a motor housing and a motor shaft supported for rotation relative to said motor housing about a motor axis, said motor shaft adapted to be coupled to a wheel component for driving a vehicle wheel, and wherein said motor housing includes a housing recess at one end face of said electric motor;
a parking brake disk mounted on said motor shaft for rotation with said motor shaft about said motor axis, and wherein said parking brake disk is slidable relative to said motor housing in a direction common with said motor axis;
at least one brake piston held against rotation and mounted for sliding movement in a direction common with said motor axis, said at least one brake piston and said parking brake disk being received within said housing recess, wherein said at least one brake piston includes a plurality of brake pistons slidably suorted by a brake housing that is mounted to said motor housing, and wherein said brake housing includes a plurality of piston openings, one piston opening for each of said brake pistons, wherein each piston opening extends entirely through a thickness of said brake housing from an outboard end face of said brake housing to an inboard end face of said brake housing; and
wherein said at least one brake piston is held in a release position by a first mechanism and said at least one brake piston being movable to engage said parking brake disk by a second mechanism to hold said parking brake disk in a park applied position.

2. The wheel drive according to claim 1 wherein said motor shaft has a first end that is to be coupled to the wheel component and a second end that supports said parking brake disk, with said parking brake disk being located at a position directly adjacent said external surface of said motor housing and said at least one brake piston.

3. The wheel drive according to claim 2 including an end cap mounted on an opposite of said at least one brake piston from said parking brake disk to enclose said at least one brake piston and said parking brake disk within said housing recess formed between said external surface of said motor housing and said end cap.

4. The wheel drive according to claim 1 wherein the vehicle wheel is to be rotatable about a wheel axis, and wherein said motor axis will be coaxial with the wheel axis.

5. The wheel drive according to claim 1 wherein said first mechanism comprises a fluid pressure system that holds said parking brake disk in the release position.

6. The wheel drive according to claim 1 wherein said second mechanism comprises a resilient mechanism that moves said parking brake disk to said park applied position in response to a parking brake request.

7. The wheel drive according to claim 1 wherein said first mechanism comprises a hydraulic system that holds said parking brake disk in the release position via a hydraulic pressure force and wherein said second mechanism comprises a spring system that applies a parking brake force by moving said parking brake disk into engagement with said motor housing when said hydraulic pressure force falls below a predetermined pressure level.

8. The wheel drive according to claim 1 including a layer of friction material on at least one of said motor housing, said parking brake disk, and said at least one brake piston.

9. The wheel drive according to claim 1 wherein said wheel component comprises a gear reduction which is configured to drive the vehicle wheel, and wherein said motor shaft extends along said motor axis from an inboard end to an outboard end, and wherein said parking brake disk is mounted to said inboard end of said motor shaft and said outboard end of said motor shaft provides driving input to said gear reduction.

10. The wheel drive according to claim 9 wherein said motor shaft includes a reduced diameter portion at said inboard end that supports a bearing, and wherein said parking brake disk is positioned inboard of said bearing between said motor housing and a motor end cap that encloses said housing recess.

11. The wheel drive according to claim 1 wherein said first mechanism reacts against one said of said at least one brake piston and said second mechanism reacts against an opposite side of said at least one brake piston.

12. The wheel drive according to claim 11 wherein said first mechanism includes a fluid chamber that is defined by said one side of said at least one brake piston, and wherein said second mechanism includes at least one resilient member that reacts directly against said opposite side of said at least one brake piston.

13. The wheel drive according to claim 1 wherein said parking brake disk is only comprised of a single disk.

14. A wheel drive comprising:
an electric motor having a motor housing and a motor shaft supported for rotation relative to said motor housing about a motor axis, said motor shaft adapted to be coupled to a wheel component for driving a vehicle wheel;
a parking brake disk mounted on said motor shaft for rotation with said motor shaft about said motor axis, said parking brake disk being axially movable relative to said motor housing along said motor axis between a park release position and a park applied position;
at least one brake piston fixed to said motor housing such that said at least one brake piston is constrained from rotation and is mounted for sliding movement relative to said motor housing, and wherein said at least one brake piston includes at least one piston recess, wherein said at least one brake piston comprises a plurality of brake pistons slidably supported by a brake housing that is mounted to said motor housing;

a fluid pressure mechanism providing a fluid pressure force that holds said parking brake disk in said park release position; and a resilient mechanism received within said at least one piston recess to move said parking brake disk to said park applied position when said fluid pressure force falls below a predetermined fluid pressure level, wherein said resilient mechanism comprises a plurality of spring assemblies, each of said plurality of brake pistons including one piston recess for receiving one of said plurality of spring assemblies, and wherein said brake housing includes a plurality of piston openings, one piston opening for each of said brake pistons, wherein each piston opening extends entirely through a thickness of said brake housing from an outboard end face of said brake housing to an inboard end face of said brake housing.

15. The wheel drive according to claim 14 wherein said motor shaft has a first end that is to be coupled to the wheel component and a second end that supports said parking brake disk, and including a vehicle wheel brake assembly that provides primary braking of the vehicle wheel in response to operational braking requests, said parking brake disk being independent from the vehicle wheel brake assembly.

16. The wheel drive according to claim 15 wherein said motor housing includes an internal surface defining a motor cavity and an external surface, said parking brake disk being mounted externally relative to said external surface such that said at least one brake piston forces said parking brake disk into direct engagement with said external surface of said motor housing when moved into said park applied position.

17. The wheel drive according to claim 16 wherein said parking brake disk is connected to said motor shaft via a spline connection, said at least one piston recess being formed within an inboard facing surface of said at least one brake piston, and including an end cap that encloses said at least one brake piston and said parking brake disk within a housing recess formed between said end cap and said external surface of said motor housing such that said resilient mechanism reacts between said at least one brake piston and said end cap.

18. The wheel drive according to claim 14 including a brake actuating ring positioned axially between said plurality of brake pistons and said parking brake disk, and wherein each of said plurality of pistons includes an increased diameter flange portion at one end such that a fluid cavity is formed about each of said plurality of pistons between said increased diameter flange portion and said brake housing, said fluid cavities to receive a fluid that supplies said fluid pressure force to hold said parking brake disk in said park release position, and wherein each spring assembly moves a corresponding brake piston into engagement with said brake actuating ring when said fluid pressure force falls below said predetermined fluid pressure level, which causes said brake actuating ring to move into engagement with said parking brake disk, which in turn moves said parking brake disk into engagement with said motor housing to achieve said park applied position.

19. The wheel drive according to claim 14 wherein said wheel component comprises a gear reduction which is configured to drive the vehicle wheel, and wherein said motor shaft extends along said motor axis from an inboard end to an outboard end, and wherein said parking brake disk is mounted for sliding movement along said inboard end of said motor shaft and said outboard end of said motor shaft provides driving input to said gear reduction.

20. The wheel drive according to claim 19 wherein said motor shaft includes a reduced diameter portion at said inboard end that supports a bearing, and wherein said parking brake disk is positioned inboard of said bearing between said motor housing and a motor end cap.

21. The wheel drive according to claim 14 wherein said fluid pressure mechanism reacts against one side of said at least one brake piston and said resilient mechanism reacts against an opposite side of said at least one brake piston.

22. The wheel drive according to claim 21 wherein said fluid pressure mechanism includes a fluid chamber that is defined by said one side of said at least one brake piston, and wherein said resilient mechanism includes at least one resilient member that reacts directly against said opposite side of said at least one brake piston.

23. The wheel drive according to claim 14 wherein said parking brake disk is only comprised of a single disk.

24. A wheel drive comprising:

an electric motor having a motor housing and a motor shaft supported for rotation relative to said motor housing about a motor axis, said motor shaft adapted to be coupled to a wheel component for driving a vehicle wheel;

a parking brake disk mounted on said motor shaft for rotation with said motor shaft about said motor axis, and wherein said parking brake disk is slidable relative to said motor housing in a direction common with said motor axis;

at least one brake piston held against rotation and mounted for sliding movement relative to said motor housing, said at least one brake piston including at least one piston recess, wherein said at least one piston comprises a plurality of pistons that are supported by a brake housing attachable to said motor housing, and wherein said brake housing includes a plurality of piston openings, one piston opening for each of said brake pistons, wherein each piston opening extends entirely through a thickness of said brake housing from an outboard end face of said brake housing to an inboard end face of said brake housing;

a resilient mechanism received within said at least one piston recess; and wherein said at least one brake piston is held in a release position by a release mechanism and said at least one brake piston is movable to engage said parking brake disk by said resilient mechanism to hold said parking brake disk in a park applied position.

25. The wheel drive according to claim 24 including an end cap facing an open end of said at least one piston recess such that said resilient mechanism reacts between said end cap and said at least one piston.

26. The wheel drive according to claim 24 wherein said motor housing includes a housing recess at one end face of said electric motor, said at least one brake piston and said parking brake disk being enclosed within said housing recess by said end cap.

27. The wheel drive according to claim 24 wherein said at least one parking brake disk comprises a single member that directly engages said motor housing.

28. The wheel drive according to claim 24 wherein said wheel component comprises a gear reduction which is configured to drive the wheel.

29. The wheel drive according to claim 28 wherein said motor shaft extends along said motor axis from an inboard end to an outboard end, and wherein said parking brake disk is mounted to said inboard end of said motor shaft and said outboard end of said motor shaft provides driving input to said gear reduction.

30. The wheel drive according to claim 29 wherein said motor shaft includes a reduced diameter portion at said inboard end that supports a bearing, and wherein said parking brake disk is positioned inboard of said bearing between said motor housing and a motor end cap.

31. The wheel drive according to claim 24 wherein said release mechanism comprises a vehicle fluid pressure system with a fluid that holds said brake piston in said release position, and wherein in response to a parking brake request fluid is discharged and said resilient mechanism moves to hold said parking brake disk in said park applied position.

32. The wheel drive according to claim 24 wherein said release mechanism reacts against one side of said at least one brake piston and said resilient mechanism reacts against an opposite side of said at least one brake piston.

33. The wheel drive according to claim 32 wherein said release mechanism includes a fluid chamber that is defined by said one side of said at least one brake piston, and wherein said resilient mechanism includes at least one resilient member that reacts directly against said opposite side of said at least one brake piston.

* * * * *